United States Patent

El Khiati et al.

[11] Patent Number: 6,063,718
[45] Date of Patent: May 16, 2000

[54] SILICA-SODA-LIME GLASS COMPOSITIONS AND THEIR APPLICATIONS

[75] Inventors: Nathalie El Khiati, Deuil la Barre; Nathalie Dideron, Paris; Daniel Ricoult, Palaiseau; Pascale Laborde, La Grande Paroisse, all of France

[73] Assignee: Saint-Gobain Vitrage, Courbevoie, France

[21] Appl. No.: 09/008,075

[22] Filed: Jan. 16, 1998

[30] Foreign Application Priority Data

Jan. 17, 1997 [FR] France .................... 97 00498

[51] Int. Cl.$^7$ .................... C03C 3/093; C03C 3/087
[52] U.S. Cl. .................... 501/70; 501/67; 501/72; 501/66
[58] Field of Search .................... 501/67, 70, 72, 501/66

[56] References Cited

U.S. PATENT DOCUMENTS

| | | | |
|---|---|---|---|
| 4,015,966 | 4/1977 | Weaver | 65/99.4 |
| 4,665,039 | 5/1987 | Kokubu et al. | |
| 5,292,690 | 3/1994 | Kawachi et al. | 501/33 |
| 5,599,754 | 2/1997 | Maeda et al. | 501/70 |
| 5,776,844 | 7/1998 | Koch et al. | 501/70 |
| 5,780,371 | 7/1998 | Rifqi et al. | 501/67 |
| 5,858,897 | 1/1999 | Maeda et al. | 501/70 |
| 5,900,296 | 5/1999 | Hyashi et al. | 501/70 |

FOREIGN PATENT DOCUMENTS

| | | |
|---|---|---|
| 0 525 555 | 2/1993 | European Pat. Off. |
| 0 592 237 | 4/1994 | European Pat. Off. |
| 196 15 688 | 10/1996 | Germany |
| WO 96/11887 | 4/1996 | WIPO |
| 98/01400 | 1/1998 | WIPO |

OTHER PUBLICATIONS

Derwent Abstracts, AN 91–097670, JP 3–040 933, Feb. 21, 1991 (with English translation of the specification).
Patent Abstracts of Japan, vol. 96, No. 10, Oct. 31, 1996, and JP 08–165138, Jun. 25, 1996.
Patent Abstracts of Japan, vol. 96, No. 9, Sep. 30, 1996, and JP 08–133778, May 28, 1996.

*Primary Examiner*—C. Melissa Koslow
*Assistant Examiner*—David Sample
*Attorney, Agent, or Firm*—Oblon, Spivak, McClelland, Maier & Neustadt, P.C.

[57] ABSTRACT

The invention relates to a glass composition intended for the manufacture of thermally stable substrates or panes, which comprises the following constituents in the following proportions by weight:

| | |
|---|---|
| $SiO_2$ | 55–70% |
| $Al_2O_3$ | 0–5% or 5–10% |
| $ZrO_2$ | 5–10% or 0–5% |
| $B_2O_3$ | 0–3% |
| $Na_2O$ | 2–6% |
| $K_2O$ | 5–11% |
| MgO | 0–6% |
| CaO | 2–11% |
| SrO | 4–12% |
| BaO | 0–2% | with the following relationships:

$Na_2O+K_2O \geq 8\%$ $MgO+CaO+SrO+BaO > 10\%$ the said composition having a strain point which is in excess of 600° C.

18 Claims, No Drawings

SILICA-SODA-LIME GLASS COMPOSITIONS AND THEIR APPLICATIONS

BACKGROUND OF THE INVENTION

1. Field of the Invention

The present invention relates to glass compositions which are suitable for being converted into a glass ribbon from which panes can be cut, and which resist heat well. These panes can be used to make fire-resistant glazing or can serve as substrates for the manufacture of plasma screens, electroluminescent screens and cold-cathode screens (field-emission displays).

2. Discussion of the Background

The glass typically used to make substrates of this type is a glass belonging to the family of silica-soda-lime glasses commonly used to manufacture glazing intended for buildings or motor vehicles. Although this type of glass is generally satisfactory in terms of its chemical stability, planarity and the defects which it has, its thermal stability sometimes leaves something to be desired.

During the manufacture of the emissive screens of the plasma screen type, the substrate is subjected to a number of heat treatments which are intended to stabilize the dimensions of the said substrate and fix a series of layers of different compounds, for example enamels, deposited on its surface. In order to fix these layers, the thicknesses of which may vary, it is necessary for the substrate to be heated to temperatures in excess of 550° C. Although the coefficient of expansion of the silica-soda-lime glass which is used is of the same order of magnitude as that of the compounds deposited on its surface, its thermal stability is insufficient and it is necessary to place it on a rectified slab during the heat treatments in order to prevent any deformation.

The glasses used for manufacturing fire-resistant glazing generally belong to the borosilicate glass family. These glasses, which resist heat and thermal shock very well, are generally characterized by a low coefficient of expansion. The latter characteristic makes it impossible for high stresses to be developed in these glasses by thermal toughening, which limits the extent to which their mechanical strength can be increased in this way.

New families of glass compositions have therefore been developed and described in patent WO-96/11887, in order to overcome these drawbacks, in particular in order to make it possible to manufacture panes or substrates having substantially no deformation during heat treatments of the order of 550 to 600° C. and capable, through thermal toughening, of exhibiting stress levels comparable with those obtained with standard silica-soda-lime glass.

One family of glass compositions which is particularly advantageous for a plasma screen application described in the aforementioned patent is that which uses little or no alumina ($Al_2O_3$), a high level of zirconia ($ZrO_2$) and very specific alkaline-earth metal oxide contents, including barium oxide (BaO).

However, in a way which has not yet been explained, it has been found that, in some cases, substrates or panes subjected to customary treatment cycles, in excess of 500° C., can develop optical defects which, in particular, are manifested by local colorations, and these defects persist after washing. This optical degradation impairs the production efficiency.

SUMMARY OF THE INVENTION

The object of the present invention was therefore to ascertain the reasons for the appearance of these optical defects and to provide improved glass compositions capable of remedying this situation, while retaining the properties mentioned above.

The invention relates to a glass composition intended for the manufacture of thermally stable substrates or panes, which comprises the following constituents in the following proportions by weight, according to a first embodiment:

| | |
|---|---|
| $SiO_2$ | 55–70% |
| $Al_2O_3$ | 0–6% |
| $ZrO_2$ | 5–10% |
| $B_2O_3$ | 0–3% |
| $Na_2O$ | 2–6% |
| $K_2O$ | 5–11% |
| MgO | 0–6% |
| CaO | 2–11% |
| SrO | 4–12% |
| BaO | 0–2% |
| $SO_3$ | greater than 0 and at most 0.5% |

The following relationships, still in proportions by weight, are also adhered to in the composition:

$Na_2O+K_2O \geq 8\%$, preferably $\geq 10\%$, for example between 10 and 15%

$MgO+CaO+SrO+BaO>10\%$, preferably >13%, more preferably $\geq 15$, most preferably $\geq 18\%$, and wherein the said composition has a strain point which is in excess of 600° C.

According to a second embodiment, the constituents of the preceding composition are left unchanged, at identical levels, apart from two oxides, zirconia and alumina.

In this embodiment, the percentage levels of these two components are:

| | |
|---|---|
| $Al_2O_3$ | 5–10% |
| $ZrO_2$ | 0–5%, | and wherein the compositions according to the second embodiment have a strain point in excess of 570–580° C., preferably in excess of 600° C.

With compositions of this type, the substrates or panes can undergo the heat treatments needed for their application, for example as plasma screens, without optical degradation. Firstly, the inventors succeeded in identifying what generated the defects: during the heat treatments, the substrates rest on supports, in particular on rollers, blocks or continuous surfaces. They observed that, under the effect of heat there was a possibility of crystals developing, more particularly starting from regions where there is point contact between the panes/substrates and their supports. These crystals locally give these panes/substrates a hue tending towards yellow and consist principally of barium sulphate ($BaSO_4$); The barium, coming from BaO and the sulphate migrating to the surface of the glass, crystallizing into $BaSO_4$ under certain conditions.

A first approach for solving this problem could have been to omit the sulphur from the glass. However, it is almost always present as an impurity introduced by the raw materials of the other constituents of the glass, at levels which are generally of the order of hundreds to thousands of ppm and/or as a refining agent and/or by sulphur contained in the atmosphere becoming incorporated in the glass, in particular at the outlet of the forming tool. The use of raw materials which are pure enough to leave the glass free of sulphur would entail prohibitive extra costs. Furthermore, the presence of sulphur in the glass may make it easier to refine during forming.

The approach adopted in the context of the invention was to control the level of BaO in the glass, in particular to keep it to a very low level or even 0. If no BaO at all is used in the glass, the problem is greatly resolved. However, as will be explained below, barium oxide is an alkaline-earth metal oxide which may be advantageous with a view to giving the glass specific properties. It may therefore be expedient to keep up to 1 or 2% of BaO in the glass, even though this may make it necessary to slightly modify the conditions of the heat treatments in order to suppress the formation of $BaSO_4$ crystals which, even in trace quantities, prove to have a very detrimental effect on the optical quality. This may, in particular, involve adding a suitable washing step after one or more of the heat treatments.

It is to be emphasized that this suppression of the optical defects due to the formation of $BaSO_4$ crystals is not achieved to the detriment of the other properties desired for the glass.

Thus it is generally accepted that glass no longer exhibits viscous behavior below a characteristic temperature referred to as the strain point, which corresponds to a viscosity on the order of $10^{14.5}$ poise. This temperature is therefore an advantageous reference point for evaluating the thermal stability of a glass. By virtue of the combination of constituents as results from the definition of the invention, glasses which conform to this definition have a strain point in excess of 600° C., a temperature which is at least about 90° C. higher than that of a conventional silica-soda-lime glass. The compositions according to the invention achieve strain point values which are fully comparable with those obtained with other compositions which were designed for the manufacture of plasma screens and use significant quantities of BaO, such as the ones described in the aforementioned patent WO-96/11887.

This combination of constituents also makes possible to obtain glasses whose coefficient of expansion is still on the same order of magnitude as that of a traditional silica-soda-lime glass, that to say coefficients, measured in known fashion by differences in expansion at temperatures of between and 300° C., which are generally between 80 and $90.10^{-7°}$ $C.^{-1}$, in particular between 82 and $86.10^{-7°}$ $C.^{-1}$.

The glasses according to the invention have the advantage of being well-suited to the melting techniques associated with the process of floating glass on a molten metal bath. Indeed, it is found that these glasses lead to very little corrosion of the refractory materials, of the AZS type (alumina-zirconia-silica) which are conventionally used in this type of furnace. These glasses thus optimize the operating time of the furnace.

The glasses according to the invention also have the advantage that they can be melted and converted into a glass ribbon at temperatures close to those adopted for the manufacture of a conventional silica-soda-lime glass.

Thus, they generally have a liquidus temperature $T_{liq}$ of at most 1180° C., preferably between 1150° C. and 1170° C., and reach a viscosity v in poise, corresponding to log v=3.5, at a temperature $T_{log3.5}$ of at least 1160° C., preferably between 1160° C. and 1200° C. These liquidus temperature values demonstrate that the vitrifiable raw materials melt at industrially "acceptable" temperatures. These $T_{log3.5}$ temperatures indicate to the person skilled in the art the temperatures above which the viscosity is too low for the forming of the glass to be carried out.

In their aforementioned $T_{liq}$ and $T_{log3.5}$ value ranges, the compositions according to the invention advantageously have a "working interval" defined by the difference $T_{log3.5}-T_{liq}$ (corresponding to the temperature region in which melting and forming of the glass can be performed) which is positive, and is preferably at least 10° C. to 30° C. These intervals, which could seem "narrow" for standard silica-soda-lime glasses intended for manufacturing glazing, are here sufficient to ensure high-quality forming without adopting excessively extreme conditions for operating the furnace. They are in fact quite specialized glasses, for applications of the high value-added, high-technology type, such as plasma screens where very precise control and tailoring of the operation of the furnace may be regarded as "allowable". "Accessible" working intervals are kept to without disruption or risks for the furnace.

The compositions as modified according to the invention make it possible to maintain the high insulating power, in terms of electricity, of the glass. Thus, the glasses according to the invention generally have a resistivity ρ in ohm.cm corresponding, at 250° C., to a log ρ with a value of at least 9, preferably between 9 and 11. Although the invention has reduced or even eliminated from the glass the BaO, which was, however, advantageous in particular in electrical terms because it is highly insulating, this absence or reduction is found to be compensated for by the increased presence of other elements, in particular from the alkaline-earth metal oxide family, which have similar electrical properties to BaO.

The glasses according to the invention generally have a density at 25° C. of less than 3, preferably of about 2.7. To give a concrete idea, it may be pointed out that a glass which is of similar composition but contains at least 6 to 7% of BaO has a density of at least 3. This is not an arbitrary characteristic. When the intention is to apply these glasses as plasma screens for television sets, in particular, the weight of the glass is problematic, and anything which may contribute to making it more lightweight is very advantageous, given that televisions using these screens are intended to be wall-mounted.

DETAILED DESCRIPTION OF THE PREFERRED EMBODIMENTS

The preferred levels of each of the constituents in the glasses according to the invention will now be specified and justified. Specifically, the absence or reduction in the level of BaO had to be compensated for by the presence, or increased presence, of other oxides whose combined effects allow them to "replace" BaO as regards its essential properties.

The choice of the invention was to keep approximately the same sum of the levels of the alkaline-earth metal oxides as in glass-making compositions which use more than 2% of BaO, for example by using a significant level of SrO which is the closest alkaline-earth metal oxide to BaO in chemical terms, and which therefore has a very similar effect on the properties of the glass, in particular in terms of strain point, coefficient of expansion and meltability. Nevertheless, a maximum threshold for SrO needs to be provided, preferably at 10%, for reasons of cost and the risk of devitrification.

It is also preferable not to seek to "compensate" essentially for BaO by excessively high levels of CaO or MgO. The reason for this is that, when increasing the presence of alkaline-earth metal oxides in the glass as fluidizing agents in order to raise the strain point, an excessive level of CaO and MgO, on the one hand, may tend to cause premature wear of the refractory materials of the furnace, and on the other hand may lead to their combined crystallization in the form of a diopside and risk devitrifying the glass.

It revealed also advantageous to decrease the amount of alkaline-earth oxide in order to minimize the risks of breakage of the glass due to thermal treatments, and also in order not to render fragile the glass from a mechanical point of view. Avoiding thermal breakage is notably an essential objective for the glasses used in fire-resistant glazing.

Preferably, the sum of the contents in weight percentages of MgO+CaO+SrO+BaO is at least 10%, preferably between 10 and 25%, more preferably between 15 and 25%, and most preferably between 18 to 24%.

According to the invention, the tendency is therefore to compensate only "partially" for BaO by other alkaline-earth metal oxides, and provision is preferably made for the combined increase of other agents with a flux effect in the glass as well, more particularly alkali metal oxides, and $K_2O$ in preference to $Na_2O$. The reason for this is that, although the two types of alkali metal oxides $Na_2O$ and $K_2O$ are necessary, nevertheless, if it is desired to increase the overall content, it is preferable to favor an increase in $K_2O$, which has the advantage of fluidizing without lowering the strain point, and is therefore not too detrimental in terms of the hardness properties of the glass after forming. A ratio between the $K_2O/Na_2O$ percentages by weight of at least 1.5, and preferably of about 2 is thus advantageously preferably provided.

There is also a tendency, in the scope of the invention, to use relatively high $SiO_2$ levels for this type of glass. This is because $SiO_2$ plays an essential role in the glass: levels of at least 55% by weight contribute to high strain point values being obtained. Nevertheless, a reasonable maximum level should be provided, preferably at about 60%, because above this, melting the vitrifiable mixture tends to require high temperatures which are expensive in terms of energy and speed up the wear of the refractory materials of the furnace. Tailoring the level of silica therefore makes it possible to contribute to maintaining sufficient meltability while keeping the hardness level of the glasses of the invention at levels comparable to those of glasses with BaO.

The alumina ($Al_2O_3$) is optional. If it is provided, it is preferable to keep it at low levels, above which the glass becomes fairly corrosive with respect to the refractory materials of the furnace, and the viscosity of the glass starts to increase too significantly at high temperature. Its presence at low levels may present advantages, in particular by increasing the chemical stability of the glass.

Zirconia ($ZrO_2$) fulfills a stabilizing role. This oxide to some extent increases the chemical stability of the glass and promotes the increase in the strain point. Too high a percentage of $ZrO_2$ tends to make the melting difficult. Although this oxide is difficult to melt, it has the advantage that, compared to other oxides such as silica or alumina, it only moderately increases the viscosity of the glasses according to the invention at high temperatures. This makes it possible to avoid introducing into these glasses oxides such as $B_2O_3$, one of the effects of which is to reduce the viscosity of the glass, or to avoid excessively increasing the level of the alkali metal oxides which have the same effect.

Indeed, alumina and zirconia fulfill essentially similar roles, and it is therefore possible to provide sums of the $Al_2O_3+ZrO_2$ at levels in excess of 8%, preferably between 9 and 15%, and vary their respective proportions.

According to the first embodiment of the invention, with a constant $Al_2O_3+ZrO_2$ sum, low levels of alumina, from 0 to 5% and higher levels of zirconia, from 5 to 10%, may be chosen.

According to a second embodiment of the invention, still with a constant $Al_2O_3+ZrO_2$ sum, the reverse approach may be chosen, with a low level of zirconia, from 0 to 5% and a higher level of alumina, from 5 to 10%. In this second embodiment, on account of the corrosion problems which are associated with alumina and were mentioned above, it is preferable to adapt the refractory materials of the furnaces, in particular by choosing refractory materials which withstand corrosion better than usual refractory materials of the "AZS" type (alumina-zirconia-silica).

As mentioned above, the oxides $Na_2O$ and $K_2O$ make it possible to keep the melting point of the glasses according to the invention, and their viscosities at high temperatures, within the limits indicated above. To this end, the sum of the levels of these oxides remains greater than about 10%, preferably between 10 and 15%.

The alkaline-earth metal oxides introduced into the glasses according to the invention have the overall effect of raising the strain point, which is why the sum of their contents by weight MgO+CaO+SrO+BaO needs to be greater than 10%, preferably between 15–25% and more preferably between 18–24%. Above about 24 to 25%, the ability of the glasses to devitrify may become increased in proportions which are incompatible with a process for forming the glass by floating on a metal bath.

The boron oxide ($B_2O_3$) is optional. A small quantity of it may be provided in order to adjust the viscosity of the glass at high temperature.

The preferred levels, in percentages by weight, of the constituents of the glasses according to the invention are listed below:

the level of $SiO_2$ is preferably between 55–60%, more preferably between 57–59% the level of $B_2O_3$ is preferably between 0–1% the level of $Na_2O$ is preferably between 3–5% the level of $K_2O$ is preferably between 5–9%, more preferably between 6–8% the level of MgO is preferably between 1–6%, more preferably between 1–5% the level of CaO is preferably between 6–11%, more preferably between 8–10%, the level of SrO is preferably between 6–12%, more preferably between 8–12%, the level of BaO is preferably between 0–2%, more preferably between 1–2%, the level of $SO_3$ is usually between 0.005–0.15%.

The first embodiment of the invention, with a low level of alumina and a high level of zirconia, has preferably:

the level of $Al_2O_3$ between 1–4% and the level of $ZrO_2$ between 6–9%.

The second embodiment of the invention preferably has:

the level of $Al_2O_3$ between 6–9% and the level of $ZrO_2$ between 1–4%.

It may be pointed out that the glasses according to the invention may be entirely free of BaO, or with the BaO present only as an impurity included in the glass unintentionally and at levels close to 0%. In this case, there is no longer any risk of forming $BaSO_4$, and therefore no longer any risk of optical defects due to the presence of crystals of this type.

There may, however, also be 1 to 2% of this substance: these levels remain "acceptable" in so far as the formation of $BaSO_4$ during heat treatments subsequent to the forming are still avoided, or substantially avoided, but possibly at the cost of additional precautions in terms of the conditions under which these heat treatments are carried out, for example one or more suitable washing processes.

The glass compositions according to the invention can therefore be used to manufacture substrates which are essentially free of crystals based on barium sulphate, and are in particular intended for emissive screens of the plasma screen, electroluminescent screen or cold-cathode screen type. These substrates can be obtained by cutting sheets of glass from continuous glass ribbon obtained by floating the glass on a molten metal bath.

They can also be used to manufacture fire-resistant glazing, in particular also obtained by cutting a float glass ribbon, or for solar energy conversion systems of the photovoltaic cell type.

The invention will he described in more detail below with reference to the following non-limiting examples:

EXAMPLES

A first series of glasses according to examples 1 to 4 was made in the form of panes obtained by cutting after forming vitrifiable materials on a tin bath according to the well-known float process.

A second series of glasses according to examples 5 to 7 was mathematically modelled.

A third series according to examples 8 and 9 illustrate compositions with low amounts in MgO and CaO.

For each of these examples, the following table collates the chemical formulations with the contents expressed as percentages by weight, the strain point values $T_{sp}$ of the glasses, the coefficients of thermal expansion $\alpha_{(25-300°\,C.)}$ of the glasses in $°C^{-1}$, the logarithm log ρ of their resistivities in ohm.cm, their liquidus temperatures $T_{liq}$, their temperatures at viscosities in poise corresponding respectively to log 1.6 and log 3.5 $T_{log1.6}$ and $T_{log3.5}$, their densities d measured at 25° C. All these temperatures are expressed in degrees Celsius.

It should be noted that only the components present in a significant and measurable amount have been indicated in the chemical formulations. It should also be understood that these glasses may contain impurities other than $SO_3$ in smaller amounts, generally less than 0.2 to 0.1% by weight of the glass composition. The levels of $SO_3$ were measured only for examples 1, 3 and 4.

These data confirm that the glasses according to the invention, having from 0 to 2% of BaO, still have a high hardness at high temperature (strain point in excess of 600° C.), high resistivity, low thermal expansion, and lower density compared to glasses with high levels of barium oxide.

Furthermore, their manufacture, when melting in the furnace and when forming on the tin bath, raised no insurmountable problem. It is confirmed, in particular, that the difference between the temperature $T_{log3.5}$ and the liquidus temperature $T_{liq}$ remains largely positive.

Furthermore, some samples of glasses in the first series were subjected to annealing processes of the type applied to glasses intended to be used as plasma screens and intended to stabilize the glass; None of them exhibited optical defects attributable to the presence of crystals of the $BaSO_4$ type at glass/support contact points.

It should also be noted that provision may be made to incorporate lithium oxide ($Li_2O$) in the compositions, in particular as a flux agent, preferably at levels, in percentages by weight, of between 0 and 3%, more preferably between 0 and 1%.

In conclusion, the invention has developed glasses which are at least as good as glasses already described for applications of the emissive screen type but which furthermore eliminate the random occurrence of optical defects of the localized coloration type. Indeed, the invention has made it possible to find the reasons for these unfortunate colorations which occur during the heat treatments, even though it was far from obvious that $BaSO_4$ crystals were involved since the sulphur content in the glass is usually very modest. Reducing or eliminating the level of barium affords yet other advantages, in terms of cost, because the raw materials containing barium are fairly expensive compared to others, and in terms of making the glasses less heavy. FR97/00498 filed in France Jan. 17, 1997 is incorporated herein by reference.

What is claimed is:

1. A glass composition intended for the manufacture of thermally stable substrates or panes, characterized in that it comprises the following constituents in the following proportions by weight:

|  | EX. 1 | EX. 2 | EX. 3 | EX. 4 | EX. 5 | EX. 6 | EX. 7 | EX. 8 | EX. 9 |
|---|---|---|---|---|---|---|---|---|---|
| $SiO_2$ | 58 | 57.5 | 57.2 | 57.2 | 57.5 | 55.5 | 55 | 58.5 | 60.5 |
| $Al_2O_3$ | 3 | 3 | 3 | 3 | 4 | 3.5 | 3.5 | 3 | 4.5 |
| $ZrO_2$ | 8 | 7 | 9 | 9 | 6.5 | 8 | 8 | 8 | 8 |
| $Na_2O$ | 4.5 | 3.5 | 4.8 | 5 | 4 | 4.5 | 4.5 | 4 | 4.5 |
| $K_2O$ | 7.5 | 8 | 8 | 8 | 7.5 | 7.5 | 7.5 | 8 | 9 |
| MgO | 1.5 | 3 | 1.5 | 2 | 1.5 | 4 | 5 | 2 | 0 |
| CaO | 8.5 | 9 | 8.5 | 8.5 | 9 | 8.5 | 7.5 | 4.5 | 5 |
| SrO | 9 | 9 | 6 | 7 | 10 | 7.5 | 8 | 12 | 8.5 |
| BaO | 0 | 0 | 2 | 0 | 0 | 1 | 0.5 | 0 | 0 |
| $SO_3$ | 0.07–0.1 | — | 0.04 | 0.1 | — | — | — | — | — |
| $T_{sp}$ | 609 | 603 | 609 | 609 | 615.2 | 611.5 | 610.8 | 601 | 602 |
| $\alpha_{(25-300°\,C.)}$ | $83.6·10^{-7}$ | $82.6·10^{-7}$ | $84.4·10^{-7}$ | $85.4·10^{-7}$ | $83.5·10^{-7}$ | $83.2·10^{-7}$ | $82.8·10^{-7}$ | $81.2·10^{-7}$ | 82 |
| log $\rho_{(250°\,C.)}$ | 10.1 | 10.5 | 9.97 | 9.83 | 10.3 | 10.16 | 10.13 | 9.9 | — |
| $T_{liq}$ | 1160 | 1170 | 1160 | 1150 | — | — | — | 1120 | 1140 |
| $T_{log1.6}$ | 1562 | 1153 | 1566 | 1556 | 1589 | 1535 | 1525 | 1615 | 1725 |
| $T_{log3.5}$ | 1187 | 1183 | 1190 | 1181 | 1196 | 1169 | 1164 | 1217 | 1250 |
| d | 2.778 | 2.775 | 2.785 | 2.763 | — | — | — | 2.78 | 2.714 |

| | |
|---|---|
| SiO$_2$ | 55–60% |
| Al$_2$O$_3$ | 1–4% |
| ZrO$_2$ | 6–9% |
| B$_2$O$_3$ | 0–1% |
| Na$_2$O | 3–5% |
| K$_2$O | 5–9% |
| MgO | 1–6% |
| CaO | 7–11% |
| SrO | 6–10% |
| BaO | 0–1% |
| SO$_3$ | 0.005–0.15% | with the relationships:

Na$_2$O+K$_2$O$\geq$10%$\leq$15%

MgO+CaO+SrO+BaO$\geq$15%$\leq$25%

K$_2$O/Na$_2$O$\geq$1.5

Al$_2$O$_3$+ZrO$_2$$\geq$9%$\leq$15%, the said composition having a strain point which is in excess of 600° C.

2. The glass composition according to claim 1, characterized in that it has a coefficient of expansion ($\alpha_{25-300°\ C.}$) of between 80 and 90·10$^{-7}$°C-1.

3. The glass composition according to claim 1, characterized in that it has a liquidus temperature T$_{liq}$ of at most 1180° C.

4. The glass composition according to claim 1, characterized in that it has a viscosity ν in poise corresponding to log ν=3.5 at a temperature of at least 1160° C.

5. The glass composition according to claim 1, characterized in that it has a resistivity ρ in ohm.cm at 250° C. corresponding to log ρ with a value of at least 9.

6. The glass composition according to claim 1, characterized in that it has a density at 25° C. of less than 3.

7. A method of making a glass substrate for use as a fire resistant glazing or emissive screen, which substrate is free of barium sulfate crystals, comprising floating the glass composition according to claim 1 on a molten metal bath to form a glass ribbon and cutting said ribbon to form a glass pane or sheet.

8. An emissive screen comprised of a substrate formed from the glass composition according to claim 1, wherein said substrate is free of barium sulfate crystals and optical defects.

9. A glass composition intended for the manufacture of thermally stable substrates or panes, which comprises the following constituents in the following proportions by weight:

| | |
|---|---|
| SiO$_2$ | 55–70% |
| ZrO$_2$ | 0–5% |
| Al$_2$O$_3$ | 5–10% |
| B$_2$O$_3$ | 0–3% |
| Na$_2$O | 2–6% |
| K$_2$O | 5–11% |
| MgO | 0–6% |
| CaO | 7–11% |
| SrO | 4–12% |
| BaO | 0–2% |
| SO$_3$ | greater than 0% and at most 0.5% | with the relationships:

Na$_2$O+K$_2$O$\geq$8%

MgO+CaO+SrO+BaO>10%, the said composition having a strain point which is in excess of 570° C., and wherein said composition has a resistivity ρ in ohm.cm at 250° C. corresponding to log ρ with a value of at least 9.

10. The glass composition according to claim 9, characterized in that it satisfies, in proportions by weight:

MgO+CaO+SrO+BaO 10to25%.

11. The glass composition according to claim 9, characterized in that it satisfies, in proportions by weight:

K$_2$O/Na$_2$O$\geq$1.5.

12. The glass composition according to claim 9, characterized in that it satisfies, in proportions by weight:

Al$_2$O$_3$+ZrO$_2$>8%.

13. The glass composition according to claim 9, characterized in that it has a coefficient of expansion ($\alpha_{25-300°\ C}$) of between 80 to 90·10$^{-7}$ C.$^{-1}$.

14. The glass composition according to claim 9, characterized in that it has a liquidus temperature T$_{liq}$ of at most 1180° C.

15. The glass composition according to claim 9, characterized in that it has a viscosity ν in poise corresponding to log ν=3.5 at a temperature of at least 1160° C.

16. The glass composition according to claim 9, characterized in that it has a density at 25° C. of less than 3.

17. A method of making a glass substrate for use as a fire resistant glazing or emissive screen, which substrate is free of barium sulfate crystals, comprising floating the glass composition according to claim 9 on a molten metal bath to form a glass ribbon and cutting said ribbon to form a glass pane or sheet.

18. An emissive screen comprised of a substrate formed from the glass composition according to claim 9, wherein said substrate is free of barium sulfate crystals and optical defects.

* * * * *